United States Patent
Yokoyama

(10) Patent No.: US 12,091,327 B2
(45) Date of Patent: Sep. 17, 2024

(54) PRODUCTION APPARATUS AND PRODUCTION METHOD FOR CATHODE ACTIVE MATERIAL FOR LITHIUM ION SECONDARY BATTERIES

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/973,729

(22) Filed: Oct. 26, 2022

(65) Prior Publication Data
US 2023/0183093 A1    Jun. 15, 2023

(30) Foreign Application Priority Data
Dec. 15, 2021  (JP) .................................. 2021-203631

(51) Int. Cl.
*H01M 4/50* (2010.01)
*C01G 53/00* (2006.01)
(Continued)

(52) U.S. Cl.
CPC ................ *C01G 53/50* (2013.01); *F27B 9/28* (2013.01); *F27B 9/36* (2013.01); *H01M 4/505* (2013.01);
(Continued)

(58) Field of Classification Search
CPC ....... B21B 1/40; B21B 3/00; B21B 2003/006; B21B 39/10; B21B 39/14; F27B 9/36
See application file for complete search history.

(56) References Cited

U.S. PATENT DOCUMENTS 3,163,201 A * 12/1964 Wunning ............. C21D 8/1233
                                                                72/364
3,561,240 A *  2/1971 Schey ..................... B22D 11/06
                                                                72/190
(Continued)

FOREIGN PATENT DOCUMENTS

JP    2019-175694 A    10/2019
JP    2020-113429 A     7/2020
(Continued)

OTHER PUBLICATIONS

CN 111299321A, Zhou et al. Jun. 2020.*
(Continued)

*Primary Examiner* — Edward T Tolan
(74) *Attorney, Agent, or Firm* — Oliff PLC

(57) ABSTRACT

Provided is a production apparatus for a cathode active material for lithium ion secondary batteries which can improve productivity. The production apparatus is provided with: a conveying device that conveys a raw material of a cathode active material, the raw material containing a metallic compound and a lithium compound, the metallic compound including at least one metallic element selected from the group consisting of nickel, cobalt, and manganese; and a heating unit in which the raw material is heated, wherein the heating unit has at least one heating member that heats the raw material by heat conduction, the conveying device has a conveying member that conveys the raw material, the heating member heats the raw material via the conveying member, and the conveying member has a retaining part for the raw material of the cathode active material along a side part thereof in a width direction.

9 Claims, 15 Drawing Sheets

(51) Int. Cl.
  *F27B 9/28* (2006.01)
  *F27B 9/36* (2006.01)
  *H01M 4/505* (2010.01)
  *H01M 4/525* (2010.01)
  *F27D 3/00* (2006.01)
  *H01M 4/02* (2006.01)

(52) U.S. Cl.
  CPC ..... *H01M 4/525* (2013.01); *F27D 2003/0042* (2013.01); *H01M 2004/028* (2013.01)

(56) References Cited

U.S. PATENT DOCUMENTS

| | | | | |
|---|---|---|---|---|
| 3,783,666 | A | * | 1/1974 | Rosansky ........... H01M 4/0404 100/153 |
| 4,431,124 | A | * | 2/1984 | Campbell .............. B21C 47/34 226/170 |
| 5,069,427 | A | * | 12/1991 | Umlauf ................. B65H 23/10 266/104 |
| 8,402,802 | B2 | * | 3/2013 | Kuchi .................... F27D 19/00 72/200 |
| 9,419,269 | B2 | * | 8/2016 | Uematsu ................. B30B 3/005 |
| 2021/0151737 | A1 | * | 5/2021 | Dube ..................... B21B 31/08 |
| 2022/0109139 | A1 | | 4/2022 | Suzuki |
| 2022/0223832 | A1 | * | 7/2022 | Claude ................. H01M 4/382 |
| 2022/0352491 | A1 | * | 11/2022 | Li ........................ H01M 4/382 |
| 2023/0032411 | A1 | | 2/2023 | Yokoyama |
| 2023/0155106 | A1 | | 5/2023 | Hirano et al. |

FOREIGN PATENT DOCUMENTS

| | | |
|---|---|---|
| JP | 2020-198195 A | 12/2020 |
| JP | 2023-21635 A | 2/2023 |
| JP | 2023-074931 A | 5/2023 |

OTHER PUBLICATIONS

CN 113363456A, Sun et al. Sep. 2021.*
CN 107697550A, Sang Feb. 2018.*
DE 102016226300A1, Baumen et al. Jul. 2018.*

* cited by examiner

PRODUCTION APPARATUS AND PRODUCTION METHOD FOR CATHODE ACTIVE MATERIAL FOR LITHIUM ION SECONDARY BATTERIES

FIELD

The present application relates to a production apparatus and a production method for a cathode active material for lithium ion secondary batteries.

BACKGROUND

Lithium ion secondary batteries are widely used as, for example, power sources for laptop computers and mobile terminals, and power supplies for driving vehicles. Therefore, it is demanded to improve productivity of lithium ion secondary batteries, and also productivity of a cathode active material to be used for lithium ion secondary batteries.

A general production method for a cathode active material for lithium ion secondary batteries is as follows. First, a metal hydroxide containing nickel etc. which serves as a precursor, and a lithium compound (such as lithium hydroxide and lithium carbonate) are mixed to obtain a raw material of a cathode active material. Next, this raw material is oxidized by calcination. Specifically, the metal hydroxide is oxidized to a metal oxide, and the lithium compound is oxidized to lithium oxide. Next, a predetermined sagger is filled with the calcined raw material, and the raw material is fired therein. This firing causes the metal oxide and the lithium oxide in the raw material to react with each other to obtain a lithium metal oxide that is the cathode active material. The obtained cathode active material is recovered to be utilized for lithium ion secondary batteries. For example, Patent Literatures 1 to 3 each disclose such a production method for a cathode active material.

Firing equipment such as a rotary kiln is used in the step of calcining the raw material. The rotary kiln is equipment in which the raw material can be heated as being stirred in an oxidizing atmosphere, and thus, can promote the oxidation of the raw material. The reason why the raw material is calcined is for preventing the raw material from being uneven in temperature in the firing step due to the endothermic reaction since the oxidation reaction between the metal hydroxide and the lithium compound is an endothermic reaction.

Firing equipment such as a roller hearth kiln is used in the step of firing the raw material. A roller hearth kiln can heat the raw material at a higher temperature than in the calcining step, and allows the metal oxide and the lithium oxide in the raw material to react with each other to produce the cathode active material. For densification, pressure may be applied when the sagger is filled with the raw material. The densification of the raw material can increase the contact area between the metal oxide and the lithium oxide in the raw material to promote the firing.

CITATION LIST

Patent Literature

Patent Literature 1: JP 2020-113429 A
Patent Literature 2: JP 2019-175694 A
Patent Literature 3: JP 2020-198195 A

SUMMARY

Technical Problem

The rotary kiln is equipment for oxidizing the metal hydroxide and/or the lithium compound. Thus, it is necessary to actively feed air or oxygen into the rotary kiln to make the inside of the rotary kiln an oxidizing atmosphere. However, the production costs become higher due to this necessity to actively feed air or oxygen into the rotary kiln.

The roller hearth kiln is equipment for firing the calcined raw material. For uniform heating, it is necessary to fill the sagger with the raw material. However, the raw material tends to become uneven in temperature according to the way of the flow of the hot air in the equipment. Short-term heating on the raw material, which is in an uneven state in temperature, produces the cathode active material having variations in crystallinity. Therefore, it is necessary to heat the raw material for a long time in order to prevent the raw material from being uneven in temperature when the cathode active material is produced using a roller hearth kiln. To do so however increases the production costs. In addition, facilities are commonly on a large scale due to that necessary long-term heating.

An object of the present application is to provide a production apparatus and a production method for a cathode active material for lithium ion secondary batteries which can improve productivity.

Solution to Problem

The present disclosure is provided with a production apparatus for a cathode active material for lithium ion secondary batteries, the production apparatus comprising: a conveying device that conveys a raw material of a cathode active material, the raw material containing a metallic compound and a lithium compound, the metallic compound including at least one metallic element selected from the group consisting of nickel, cobalt, and manganese; and a heating unit in which the raw material is heated, wherein the heating unit has at least one heating member that heats the raw material by heat conduction, the conveying device has a conveying member that conveys the raw material, the heating member heats the raw material via the conveying member, and the conveying member has a retaining part for the raw material of the cathode active material along a side part thereof in a width direction, as one embodiment to solve the above problem.

In the production apparatus, the heating member may be a heating roller. The production apparatus may comprise: a plurality of the heating members that are heating rollers, wherein some of the heating rollers that heat one face of the raw material, and a rest of the heating rollers that heat another face of the raw material may be alternately arranged from an upstream side to a downstream side in a conveying direction, and the heating rollers may be arranged as every two adjacent ones of the heating rollers face each other so that the raw material is held therebetween. Further, in the production apparatus, the heating rollers may each have a wrap angle more than 180° and at most 360°.

In the production apparatus, in the heating unit the raw material may be heated to 700° C. to 1000° C. In the heating unit, the raw material may be heated in an oxidizing atmosphere.

In the production apparatus, the conveying member may be made of a porous heat-resistant member.

The production apparatus may further comprise: a shaping member with which the raw material is shaped into a sheet, the shaping member being on an upstream side of the heating unit in the conveying direction. The production apparatus may further comprise: a recovery part with which the cathode active material obtained in the heating unit is recovered.

The present disclosure is provided with a production method for a cathode active material for lithium ion secondary batteries, the production method comprising: preparing a raw material of a cathode active material by mixing a metallic compound and a lithium compound to obtain the raw material, the metallic compound including at least one metallic element selected from the group consisting of nickel, cobalt, and manganese; and heating the raw material, wherein in the heating, the raw material is heated by heat conduction, in the heating, the raw material is conveyed by, and heated via a conveying member, and the conveying member has a retaining part for the raw material of the cathode active material along a side part thereof in a width direction, as one embodiment to solve the above problem.

In the heating in the production method, the raw material may be conveyed and heated at the same time. In the heating in the production method, both faces of the raw material, and either one face of the raw material may be alternately heated. In the heating in the production method, the raw material may be heated using a heating roller having a wrap angle more than 180° and at most 360°.

In the heating in the production method, the raw material may be heated to 700° C. to 1000° C. In the heating in the production method, the raw material may be heated in an oxidizing atmosphere.

In the production method, the conveying member may be made of a porous heat-resistant member.

The production method may further comprise: shaping the raw material into a sheet, prior to the heating. The production method may further comprise: recovering the cathode active material obtained in the heating.

Advantageous Effects

The present disclosure can improve manufacturing productivity of a cathode active material.

DESCRIPTION OF EMBODIMENTS

1. Production Apparatus for Cathode Active Material for Lithium Ion Secondary Batteries A production apparatus for a cathode active material for lithium ion secondary batteries according to the present disclosure will be described with reference to the following first to third embodiments.

First Embodiment

Figure 1:
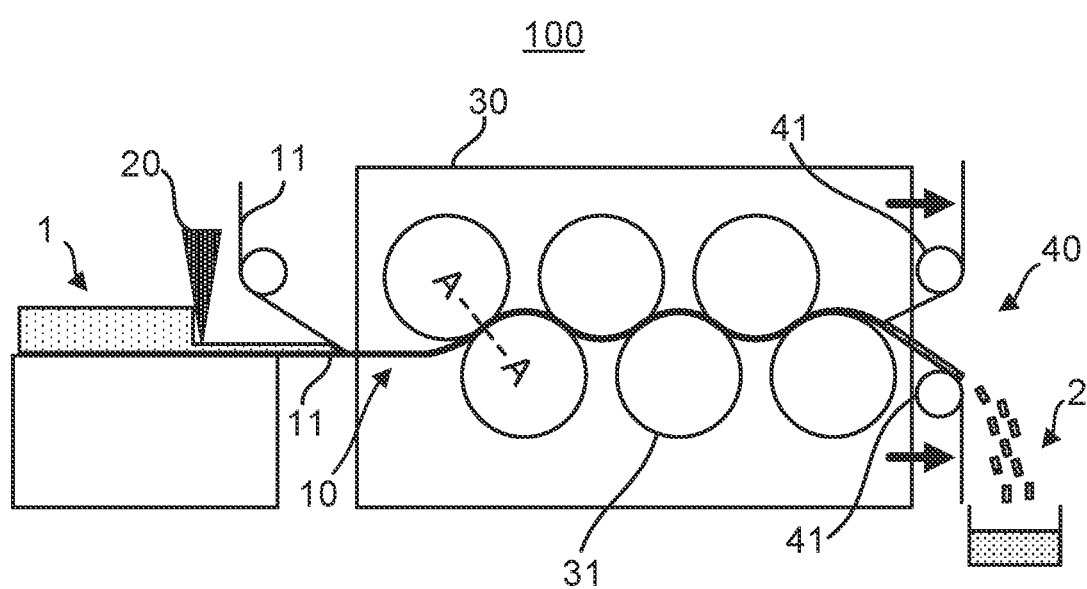
FIG. 1 is a schematic view of a production apparatus 100 for a cathode active material for lithium ion secondary batteries.

FIG. 1 is a schematic view of a production apparatus 100 for a cathode active material for lithium ion secondary batteries which is the first embodiment (which may be referred to as "production apparatus 100" in this description). Here, the right-left direction in FIG. 1 is defined as a conveying direction, the up-down direction therein is defined as a height direction, and the back-front direction therein is defined as a width direction.

As shown in FIG. 1, the production apparatus 100 is provided with a conveying device 10, a shaping member 20, a heating unit 30, and a recovery part 40. FIG. 1 also shows a raw material of a cathode active material 1 which is a raw material, and a cathode active material 2 that is a product.

<Raw Material of Cathode Active Material 1>

The raw material of a cathode active material 1 contains a metallic compound and a lithium compound, and may also contain the cathode active material 2 in an already deteriorated and pulverized state which is a recycled material or the like. The raw material 1 can be fired with high thermal uniformity in the heating unit 30 even if containing the deteriorated cathode active material 2.

The raw material 1 can be obtained by mixing these materials. The mixing way is not particularly limited, but a known method may be employed therefor. For example, these materials may be mixed with a mortar or a blender.

(Metallic Compound)

The metallic compound includes at least one metallic element selected from the group consisting of nickel, cobalt, and manganese. The metallic compound may include nickel, may include nickel and cobalt, or may include nickel, cobalt, and manganese. The metallic compound may further include any other metallic element(s). For example, the metallic compound may further include aluminum. The metallic compound may include aluminum instead of manganese.

For example, the molar ratio of the metallic elements of the metallic compound may be Ni:Co:Mn=x:y:z ($x=1-y-z$, $0 \leq y < 1$ and $0 \leq z < 1$), or Ni:Co:Al=x:y:z ($x=1-y-z$, $0 \leq y < 1$ and $0 \leq z < 1$).

The metallic compound may be a metal hydroxide, a metal oxide, a metal carbonate or a metal perhydroxide. These metallic compounds may be used alone or in combination. The metallic compound is preferably a metal hydroxide or a metal oxide.

Any known metal hydroxide including at least one metallic element selected from the group consisting of nickel, cobalt, and manganese may be used as the metal hydroxide, and examples thereof include $Ni_xCo_yMn_z(OH)_{2+\alpha}$ ($x=1-y-z$, $0 \leq y<1$, $0 \leq z<1$ and $0 \leq \alpha<1$), and $Ni_xCo_yAl_z(OH)_{2+\alpha}$ ($x=1-y-z$, $0 \leq y<1$, $0 \leq z<1$ and $0 \leq \alpha<1$). Any known metal oxide including at least one metallic element selected from the group consisting of nickel, cobalt, and manganese may be used as the metal oxide, and examples thereof include $Ni_xCo_yMn_z(O)_{2+\alpha}$ ($x=1-y-z$, $0 \leq y<1$, $0 \leq z<1$ and $-1 \leq \alpha<0$), and $Ni_xCo_yAl_z(O)_{2+\alpha}$ ($x=1-y-z$, $0 \leq y<1$, $0 \leq z<1$ and $-1 \leq \alpha<0$).

The metallic compound can be prepared by a known method. The following are an example of the method of preparing the metal hydroxide, and an example of the method of preparing the metal oxide. The method of preparing the metallic compound is not limited to them.

An example of the method of preparing the metal hydroxide is crystallization. Hereinafter an example of the method of preparing the metal hydroxide by crystallization will be described.

First, a metal source solution is prepared by dissolving a Ni source, a Co source, and a Mn source (or an Al source) in an aqueous solvent (e.g., ion-exchanged water). As the metal source, a metallic salt of each metal element (i.e., a Ni salt, a Co salt, and a Mn salt (or an Al salt)) may be used. The type of the metallic salt is not particularly limited, but any known metallic salt such as a hydrochloride, a sulfate, a nitrate, a carbonate, and a hydroxide may be used. These metal sources are added to the aqueous solvent in no particular order. One may separately prepare aqueous solutions of the metal sources, and mix them. The ratio of the metal sources is appropriately adjusted so that a desired metal hydroxide can be obtained.

Next, the metal source solution and an aqueous solution of $NH_3$ are dropped into an alkaline aqueous solution in an inert atmosphere while the alkaline aqueous solution is stirred. For example, an aqueous sodium hydroxide may be used as the alkaline aqueous solution. The pH of the alkaline aqueous solution is set in, for example, 11 to 13. The aqueous solution of $NH_3$ is dropped while the concentration thereof is kept in the range of, for example, 5 g/L to 15 g/L. Dropping the metal source solution and the aqueous solution of $NH_3$ into the alkaline aqueous solution decreases the pH of the resultant solution gradually. Thus, one may appropriately drop an alkaline aqueous solution to keep the pH in a predetermined range.

After a certain period of time has passed, the resultant is subjected to vacuum filtration, and the settling is recovered. The obtained settling is washed and dried to obtain the metal hydroxide. The settling may be washed plural times. The settling may be dried by air or by heating. The settling can be dried by heating at, for example, 120 to 300° C. The drying time is, for example, 6 to 18 hours.

The metal oxide can be prepared by, for example, subjecting the metal hydroxide to oxidizing roasting. Oxidizing roasting here is to heat the metal hydroxide in an oxidizing atmosphere. The heating temperature is not particularly limited as long as the metal hydroxide can be converted into the metal oxide thereat, but is, for example, 700° C. to 800° C. The heating time is not particularly limited as long as the metal hydroxide can be converted into the metal oxide therefor, but is, for example, 0.5 hours to 3 hours. Such heating can be carried out using firing equipment such as a rotary kiln.

The mean particle diameter of the metallic compound is not particularly limited, but is, for example, in the range of 1 μm to 1 mm. In this description, "mean particle diameter" is a median diameter that is a particle diameter at the 50% integrated value in the volume-based particle diameter distribution obtained by a laser diffraction and scattering method.

The content of the metallic compound in the raw material is appropriately set so that a desired cathode active material can be obtained.

(Lithium Compound)

The lithium compound is not particularly limited as long as being a compound including lithium. A known lithium compound may be used, and examples thereof include lithium oxide, lithium hydroxide, lithium nitrate, and lithium carbonate. Lithium hydroxide, lithium nitrate, lithium carbonate, etc. each become lithium oxide by oxidation.

The type of the lithium compound is appropriately selected according to the type of the metallic compound because the beating temperature (firing temperature) is changed according to the type of the metallic compound. For example, a case where a metal hydroxide or a metal oxide including nickel, cobalt, and manganese is used as the metallic compound needs a firing temperature at approximately 800° C. Therefore, in this case, lithium carbonate is preferably selected as the lithium compound. A case where a metal hydroxide or a metal oxide including nickel, cobalt, and aluminum is used as the metallic compound needs a firing temperature at approximately 500° C. Therefore, in this case, lithium hydroxide is preferably selected as the lithium compound.

The content of the lithium compound in the raw material is appropriately set so that a desired cathode active material can be obtained.

(Shape of Raw Material of Cathode Active Material 1)

The shape of the raw material 1 is not particularly limited, but may be a sheet. The raw material 1 in the form of a sheet is easy to be uniformly heated through. As a result, nonuniform heating is suppressed, and variations in the crystallinity of the cathode active material 2 to be produced are also reduced. In addition, the raw material 1 in the form of a sheet is easy to be pulverized at the recovery part 40.

The thickness of the raw material 1 in the form of a sheet is not particularly limited, but for example, may be at least 0.1 mm, at least 0.5 mm, at least 1 mm, at least 2 mm, at most 50 mm, at most 30 mm, less than 30 mm, at most 20 mm, at most 10 mm, or at most 5 mm. The raw material 1 in the form of a sheet having too large a thickness is difficult to be uniformly heated. The raw material 1 in the form of a sheet having too small a thickness lowers productivity.

The raw material 1 may be shaped into a sheet with the shaping member 20 and/or heating rollers 31, or may be shaped into a sheet by, for example, press molding in advance. One may shape the raw material 1 into a sheet in advance, and further shape the raw material 1 with the shaping member 20 and/or the heating rollers 31 to have a predetermined thickness.

<Conveying Device 10>

The conveying device 10 is a member for conveying the raw material 1. As in FIG. 1, the conveying device 10 is provided with a conveying member 11 that conveys the raw material 1, and a driving unit (not shown) that drives the conveying member 11.

(Conveying Member 11)

The conveying member 11 is a member (conveyor) that conveys the raw material 1. The conveying member 11 is a member in the form of a sheet, and is driven by the driving unit from the upstream side toward the downstream side in the conveying direction. It is necessary for the conveying member 11 to be arranged on the bottom face of the raw material 1 because the conveying member 11 conveys the raw material 1 as the raw material 1 is put thereon. The conveying member 11 is also arranged on the top face of the raw material 1 as shown in FIG. 1. In other words, the raw material 1 is conveyed as sandwiched between the sheets of the conveying member 11.

As described later, the production apparatus 100 is to heat the raw material 1 by contact heating. The raw material 1 may be therefore heated by direct contact with the heating rollers 31. This however causes the raw material 1 to adhere to the heating rollers 31, which leads to lowered productivity. Then, in the production apparatus 100, the heating rollers 31 are brought into contact with the raw material 1 via the conveying member 11, which prevents the raw material 1 from adhering to the heating rollers 31. For such a reason, the raw material 1 is conveyed as sandwiched between the sheets of the conveying member 11.

It is necessary to make the conveying member 11 out of a member resistant to the heating temperature in the heating unit 30 (heat-resistant member) since the conveying member 11 is to be in contact with the heating rollers 31. For example, it is necessary for the heat-resistant member to be resistant to a temperature of 900° C. or higher. Examples of such a heat-resistant member include a quartz cloth and a silica fiber cloth.

Here, it is necessary to take in oxygen from the outside in order to progress firing of the raw material 1 when a material that becomes an oxide by the oxidation, such as a metal hydroxide and a lithium hydroxide is contained in the raw material 1. Meanwhile, the firing of the raw material 1 may lead to generation of gas such as moisture (water vapor) and carbon dioxide. Therefore, the raw material 1 is preferably fired in an environment where gas can be exchanged. Thus, the conveying member 11 may be made of a porous heat-resistant member via which gas can be efficiently exchanged with the outside. The pore size of the porous heat-resistant member is not particularly limited as long as gas can be efficiently exchanged through the pores, and as long as the raw material 1 does not leak to the outside through the pores. For example, the pore size of the porous heat-resistant member may be at most 20 µm, at most 10 µm, at most 5 µm, at least 3 µm, at least 1 µm, or at least 0.5 µm. The porous heat-resistant member having too large a pore size leads to easy leakage of the raw material 1 to the outside. The porous heat-resistant member having too small a pore size lowers the efficiency of the gas exchange with the outside. An example of such a porous heat-resistant member is a fibrous heat-resistant member. Examples of the fibrous heat-resistant member include a quartz cloth and a silica fiber cloth.

Here, the pore size of the porous heat-resistant member means a diagonal length of a mesh opening obtained by the fiber diameter and the product density (unit: number of fibers/mm).

The conveying member 11 plays apart in conveying the raw material 1. Sometimes the raw material slips down from side parts of the conveying member 11 while conveyed. As described later, in the production apparatus 100, the raw material 1 is heated using the heating rollers 31 by heat conduction (contact heating). At this time, the raw material 1 in the conveying member 11 is sandwiched between the opposite heating rollers 31, and thereby, receives a load in the up-down direction. In addition, the raw material 1 in the conveying member 11 is conveyed as being in contact with the heating rollers 31 at predetermined wrap angles, which creates a predetermined tension thereon, and thereby, receives a load in the up-down direction. Then, the raw material 1 moves toward the outsides in the width direction to slip down from side parts of the conveying member 11, which is problematic. Further, the lithium compound, particularly lithium carbonate contained in the raw material 1 has a low melting point, and may melt to solate (liquify) by heating. In this case, the raw material 1 further easily slips down.

Figure 2:
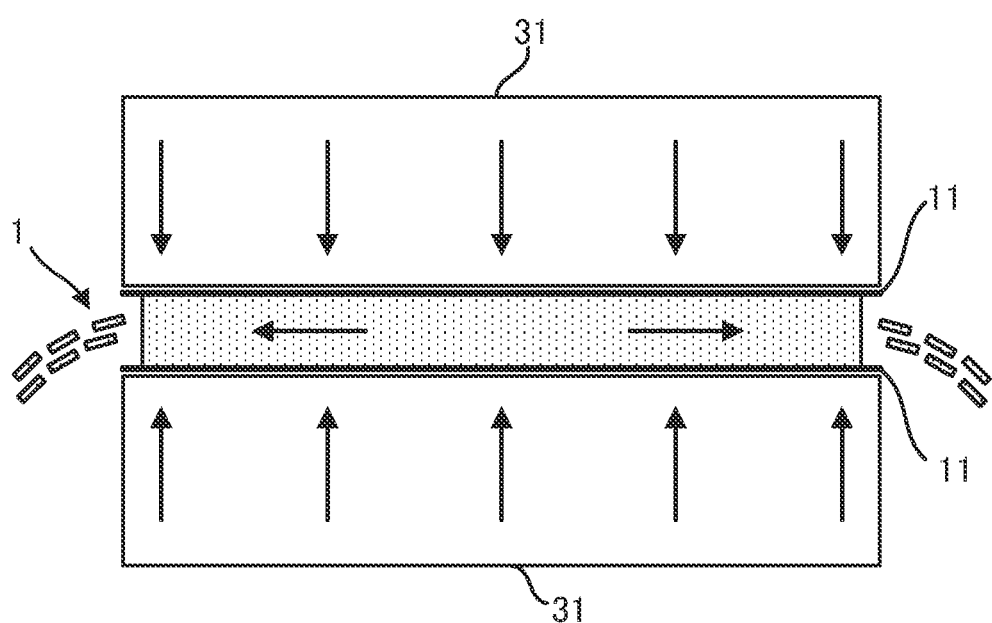
FIG. 2 is a cross-sectional view in the width direction which shows a scene where a raw material of a cathode active material 1 is slipping down from ends of a conveying member 11.

FIG. 2 is a cross-sectional view in the width direction which shows a scene where the raw material 1 is slipping down from side parts of the conveying member 11. FIG. 2 corresponds to a cross section taken along A-A of FIG. 1. As shown in FIG. 2, the pressure from the heating rollers 31 moves the raw material 1 toward the outsides in the width direction to slip down from side parts of the conveying member 11.

To suppress such slipping down, the conveying member 11 is provided with retaining parts for the raw material of the cathode active material along the side parts in the width direction. It is sufficient that the retaining part is provided along at least one side part of the conveying member 11 in the width direction. In view of more certainly preventing the raw material 1 from slipping down, the retaining parts may be provided along both the side parts of the conveying member 11 in the width direction. It is sufficient that the retaining parts are provided for either one of the sheets of the conveying member 11 between which the raw material 1 is sandwiched. In view of more certainly preventing the raw material 1 from slipping down, the retaining parts may be provided for both the sheets of the conveying member 11. FIGS. 3 to 6 show retaining parts for the raw material of the cathode active material 12a to 12d, respectively, which are specific modes. FIGS. 3 to 6 each correspond to a cross section taken along A-A of FIG. 1.

Figure 3:
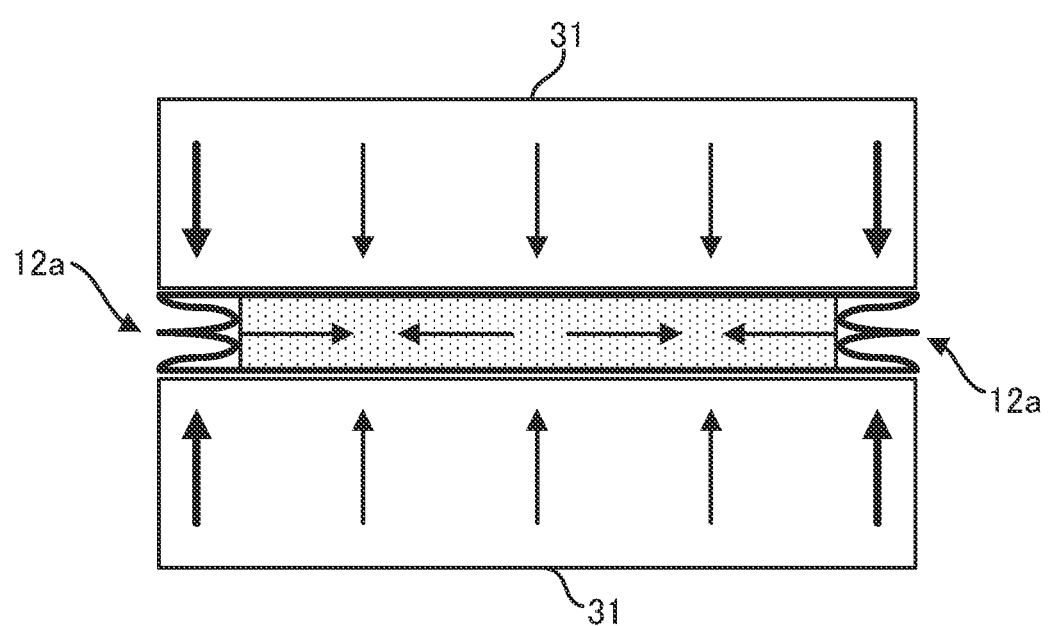
FIG. 3 is a cross-sectional view of the conveying member 11 provided with retaining parts for the raw material of the cathode active material 12a, in the width direction.

FIG. 3 is a cross-sectional view of the conveying member 11 provided with the retaining parts for the raw material of the cathode active material 12a in the width direction. The retaining parts for the raw material of the cathode active material 12a are formed by bending the side parts of the conveying member 11, respectively. In FIG. 3, the retaining parts 12a are formed by bending the side parts of the conveying member 11, respectively, which is arranged on the top and bottom faces of the raw material.

The total thickness of each of the retaining parts 12a along either side part is not particularly limited, but may be appropriately set according to the thickness of the raw material 1. This total thickness is preferably thicker than the thickness of the raw material 1 in order to concentrate the pressure from the heating rollers 31 on the side parts, to reduce the pressure applied to the raw material 1, and to prevent the raw material 1 from moving towards the outsides in the width direction. For example, the total thickness of each of the retaining parts 12a along either side part may be set to be 110% to 200% of the thickness of the raw material 1. The thickness of each of the retaining parts 12a can be appropriately set according to the number of times either side part of the conveying member 11 is bent. For example, the number of times each of the side parts of the conveying member 11 is bent may be at least 1. In FIG. 3, the number of times each of the side parts is bent is 2.

The conveying member 11 has the retaining parts 12a, and thereby, makes it possible on the side parts to push back the raw material 1 inward in the width direction to prevent the raw material 1 from slipping down. In addition, the density of the conveying member 11 on the side parts becomes higher, which makes it easier for the pressure to be applied to the side parts more than the center in the width direction when the raw material 1 comes into contact with the heating rollers 31, to prevent the raw material 1 from moving towards the outsides in the width direction to further prevent the raw material 1 from slipping down.

Figure 4:
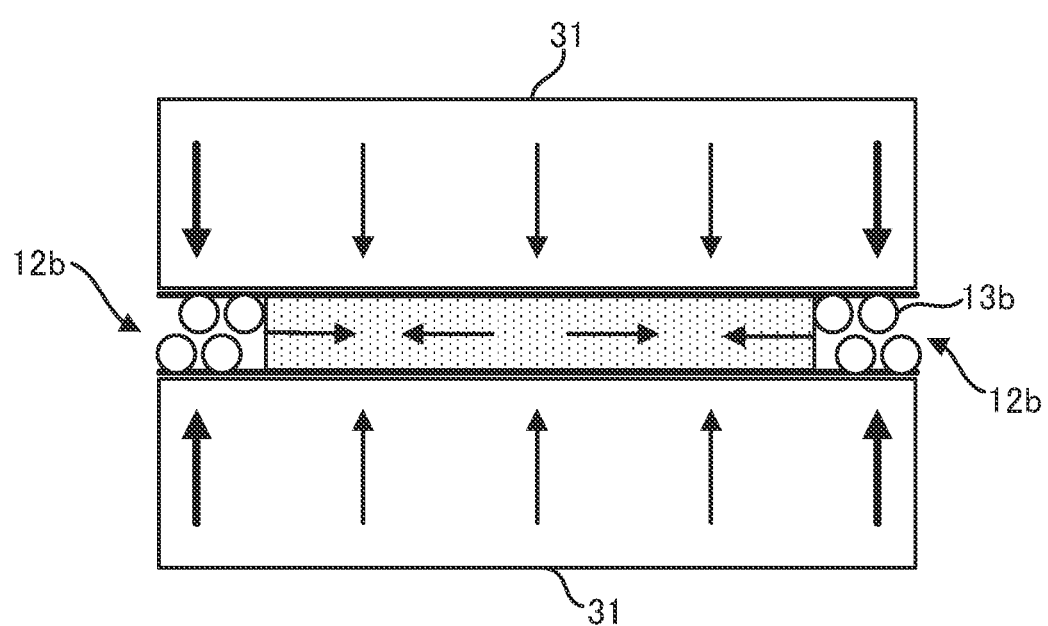
FIG. 4 is a cross-sectional view of the conveying member 11 provided with retaining parts for the raw material of the cathode active material 12b, in the width direction.

FIG. 4 is a cross-sectional view of the conveying member 11 provided with the retaining parts for the raw material of the cathode active material 12b in the width direction. The retaining parts for the raw material of the cathode active material 12b are formed by interweaving a heat resistant material 13b along the side parts of the conveying member 11. In FIG. 4, the retaining parts 12b are formed by interweaving the heat resistant material 13b along the side parts of the conveying member 11, which is arranged on the top and bottom faces of the raw material 1. Examples of the heat resistant material 13b include a string-like wire made of quartz glass or silica fiber, and a string-like wire of a bundle of metal fiber.

The total thickness of each of the retaining parts 12b along either side part is not particularly limited, but may be appropriately set according to the thickness of the raw material 1. This total thickness is preferably thicker than the thickness of the raw material 1 in order to concentrate the pressure from the heating rollers 31 on the side parts, to reduce the pressure applied to the raw material 1, and to prevent the raw material 1 from moving towards the outsides in the width direction. For example, the total thickness of each of the retaining parts 12b along either side part may be set to be 110% to 200% of the thickness of the raw material 1. The heat resistant material 13b is arranged so that oppositely arranged pieces of the material 13b can mesh witheach other along the side parts of the conveying member 11. This can further prevent the raw material 1 from slipping down.

The conveying member 11 has the retaining parts 12b, and thereby, makes it possible on the side parts to push back the raw material 1 inward in the width direction to prevent the raw material 1 from slipping down. In addition, the strength of the conveying member 11 on the side parts becomes more, which makes it easier for the pressure to be applied to the side parts more than the center in the width direction when the raw material 1 comes into contact with the heating rollers 31, to prevent the raw material 1 from moving towards the outsides in the width direction to further prevent the raw material 1 from slipping down.

Figure 5:
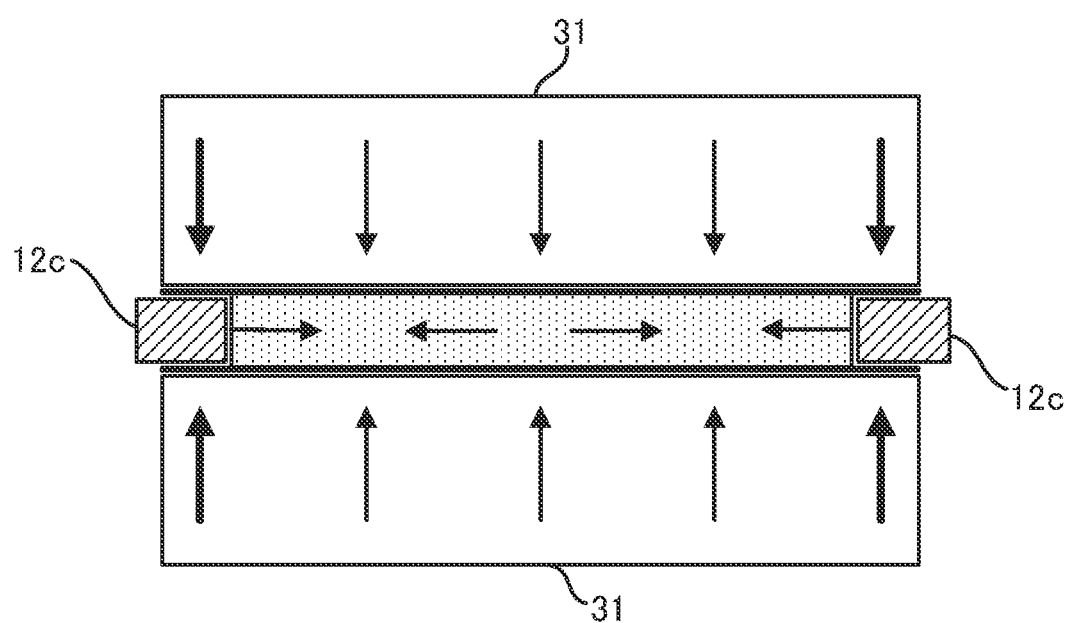
FIG. 5 is a cross-sectional view of the conveying member 11 provided with retaining parts for the raw material of the cathode active material 12c, in the width direction.

FIG. 5 is a cross-sectional view of the conveying member 11 provided with the retaining parts for the raw material of the cathode active material 12c in the width direction. The retaining parts for the raw material of the cathode active material 12c are guide members (conveyors) arranged along the side parts of the conveying member 11 between the facing sheets of the conveying member 11. The retaining parts 12c are arranged in the conveying direction of the conveying member 11. In FIG. 5, the retaining parts 12c are arranged along the side parts of the conveying member 11, respectively, between the facing sheets of the conveying member 11. For example, the retaining parts 12c (guide members) are heat-resistant members such as glass fiber sheets.

The thickness of each of the retaining parts 12c is not particularly limited, but may be appropriately set according to the thickness of the raw material 1. This thickness is preferably thicker than the thickness of the raw material 1 in order to concentrate the pressure from the heating rollers 31 on the side parts, to reduce the pressure applied to the raw material 1, and to prevent the raw material 1 from moving towards the outsides in the width direction. For example, the thickness of each of the retaining parts 12c may be set to be 110% to 200% of the thickness of the raw material 1.

The conveying member 11 has the retaining parts 12c, and thereby, makes it possible on the side parts to push back the raw material 1 inward in the width direction to prevent the raw material 1 from slipping down. In addition, the strength of the conveying member 11 on the side parts becomes more, which makes it easier for the pressure to be applied to the side parts more than the center in the width direction when the raw material 1 comes into contact with the heating rollers 31, to prevent the raw material 1 from moving towards the outsides in the width direction to further prevent the raw material 1 from slipping down.

Figure 6:
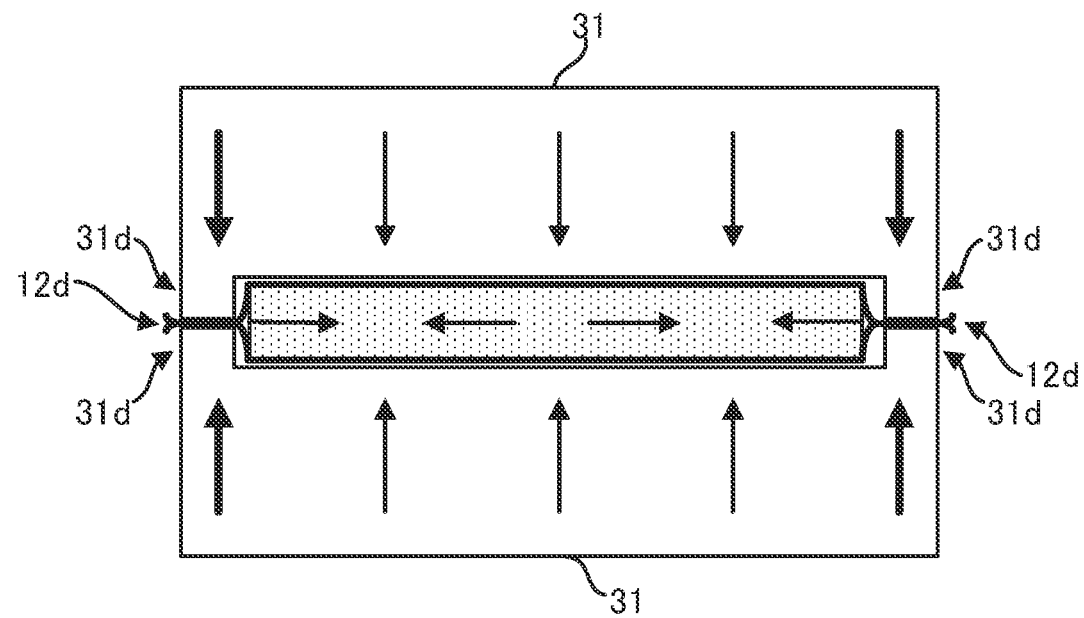
FIG. 6 is a cross-sectional view of the conveying member 11 provided with retaining parts for the raw material of the cathode active material 12d, in the width direction.

FIG. 6 is across-sectional view of the conveying member 11 provided with the retaining parts for the raw material of the cathode active material 12d in the width direction. The retaining parts for the raw material of the cathode active material 12d are formed by narrowing the side parts of the conveying member 11, which is arranged on the top and bottom faces of the raw material 1. In FIG. 6, the retaining parts 12d are formed by narrowing each of the side parts of the conveying member 11. When the conveying member 11 is provided with the retaining parts 12d, the heating rollers 31 provided with projecting parts 31d along the ends corresponding to the retaining parts 12d are used. In FIG. 6, the projecting parts 31d are provided along the respective ends of each of the heating rollers 31.

The total thickness of the projecting parts 31d along either side part is not particularly limited, but may be appropriately set according to the thickness of the raw material 1. This total thickness is preferably thicker than the thickness of the raw material 1 in order to concentrate the pressure from the heating rollers 31 on the side parts, to reduce the pressure applied to the raw material 1, and to prevent the raw material 1 from moving towards the outsides in the width direction. For example, the total thickness of the projecting parts 31d along either side part may be set to be 110% to 200% of the thickness of the raw material 1. Both the ends of each of the heating rollers 31 are provided with the projecting parts 31d; thereby a predetermined recess part is formed between every two facing heating rollers 31. As shown in FIG. 6, the raw material 1 is heated inside the recess part. Therefore, the width of each of the projecting parts 31d and the recess parts is appropriately set according to the width of the raw material 1.

Like this, the combination of the retaining parts 12d and the projecting parts 31d makes it possible on the side parts to push back the raw material 1 inward in the width direction to prevent the raw material 1 from slipping down. In addition, the pressure is easily applied to the ends of the heating rollers 31, which prevents the raw material 1 from moving towards the outsides in the width direction to further prevent the raw material 1 from slipping down. The retaining parts 12d may be formed by the projecting parts 31d, or may be formed by narrowing the side parts of the conveying member 11 in advance.

In FIG. 6, the projecting parts 31d are provided on each of the heating rollers 31, which are arranged on the top and bottom faces of the raw material 1. The present disclosure is not limited to this as long as the projecting parts 31d are provided at least on the heating rollers 31 arranged on one of the top and bottom faces. In this case, the projecting parts 31d press the retaining parts 12d against the heating rollers 31 which are arranged on the other face and where there provided no projecting parts 31*d*. Thereby, the above effect is exerted.

Specific examples of the retaining parts for the raw material of the cathode active material have been described. The mode of the retaining parts is not limited to them, but any mode that can prevent the raw material 1 from slipping down may be employed. The conveying member 11 having the retaining parts for the raw material of the cathode active material can prevent the raw material 1 from slipping down. Therefore, the apparatus 100 can improve the manufacturing productivity of the cathode active material 2.

<Shaping Member 20>

The shaping member 20 is a member with which the raw material 1 is shaped into a sheet. As shown in FIG. 1, the shaping member 20 is arranged on the upstream side of the heating unit 30 in the conveying direction. In the production apparatus 100, the shaping member 20 is an optional member since the raw material 1 may be shaped into a sheet in advance as described above.

An example of the shaping member 20 is a powder amount controlling member with which the powder amount of the raw material 1 to be conveyed is controlled to shape the raw material 1 into a sheet. Examples of the powder amount controlling member include a powder amount controlling knife shown in FIG. 1, and any members with which the raw material 1 is pressed and shaped into a sheet.

The thickness of the raw material 1 in the form of a sheet which is shaped with the shaping member 20 is not particularly limited, but for example, may be at least 0.1 mm, at least 0.5 mm, at least 1 mm, at least 2 mm, at most 50 mm, at most 30 mm, less than 30 mm, at most 20 mm, at most 10 mm, or at most 5 mm.

<Heating Unit 30>

The heating unit 30 is to heat (fire) the raw material 1. As shown in FIG. 1, the heating unit 30 is a rectangular housing, and is provided with the six heating rollers 31 (heating members) thereinside.

The raw material 1 may be heated in the heating unit 30 to at least 700° C., at least 800° C., at least 900° C., at most 1100° C., or at most 1000° C. The skilled person can set the temperature at which the raw material 1 can be appropriately fired. As described later, the raw material 1 is heated by the contact thereof with the heating rollers 31. Therefore, actually, the heating rollers 31 are heated to a predetermined temperature. The heating rollers 31 may be each heated to the same or different temperature(s). For example, some of the heating rollers 31 arranged on a more upstream side in the conveying direction may be set at a lower temperature for the purpose of the oxidation, and some of the heating rollers 31 arranged on a more downstream side in the conveying direction may be set at a higher temperature for the purpose of the firing.

The raw material 1 may be heated in an oxidizing atmosphere in the heating unit 30 in order to promote the oxidation reaction of the raw material 1. The heating unit 30 is provided with an air blowing part (not shown) in order to make the inside thereof an oxidizing atmosphere. The supply of air or oxygen from the air blowing part to the inside of the heating unit 30 can keep the inside of the heating unit 30 in an oxidizing atmosphere. Air or oxygen may be continuously supplied, so that the inside of the heating unit 30 is kept in a negative pressure. For example, a known blower can be used as the air blowing part. When the raw material does not contain any material that causes an oxidation reaction, it is not necessary to make the inside of the heating unit 30 an oxidizing atmosphere since it is not necessary to oxidize the raw material 1 in the heating unit 30.

Here, in this description, "oxidizing atmosphere" is an atmosphere that allows a target material to be oxidized, and is, for example, an atmosphere of a space which a gas containing at least 1% oxygen (e.g., air or oxygen) is supplied to, and which is thus filled with the gas. The oxygen concentration in the space may be appropriately set according to the speed at which the oxidation of the target material progresses.

(Heating Rollers 31)

The heating rollers 31 (heating members) are members to heat the raw material 1 by heat conduction. "To heat the raw material 1 by heat conduction" means what is called contact heating. The raw material 1 is heated with the heating rollers 31 via the conveying member 11. Therefore, the heat of the heating rollers 31 is conducted to the conveying member 11, and thereafter, conducted to the raw material 1, so that the raw material 1 is heated. The raw material 1 may be heated by bringing the heating rollers 31 into contact therewith via any other member in addition to the conveying member 11.

The heating rollers 31 are to heat the raw material 1 by contact heating, and features thereof are that a contacted portion can be efficiently heated, and that the thermal uniformity of the contacted portion is high. Accordingly, the time for firing the raw material 1 can be shortened, and also variations in crystallinity can be reduced. Conventionally, the two heating steps of a calcining step and a firing step are required for producing a cathode active material. However, in the production apparatus 100, the cathode active material can be obtained by firing the cathode active material raw material in one step since contact heating is followed by high thermal uniformity. Therefore, according to the production apparatus 100, the productivity of the cathode active material can be improved, and facilities can be smaller because of a shortened heating time.

The raw material 1 can be conveyed and heated at the same time by the use of the heating rollers 31 as heating members. This allows the cathode active material 2 to be continuously produced.

As shown in FIG. 1, the heating unit 30 is provided with the six heating rollers 31. The mode of arranging, and the number of the heating rollers 31 are not particularly limited. As shown in FIG. 1, the heating rollers to heat one face (e.g., the top face) of the raw material 1, and the heating rollers to heat the other face (e.g., the bottom face) thereof may be alternately arranged from the upstream to the downstream sides in the conveying direction. This allows both the faces of the raw material 1 to be equally heated. Thus, the raw material 1 uneven in temperature can be prevented.

Every two adjacent heating rollers 31 may be arranged as facing each other so as to hold the raw material 1 therebetween. This allows both the faces of the raw material 1 to be heated at the same time. Thus, heating efficiency can be improved, and unevenness in temperature can be prevented. The arrangement of every two adjacent heating rollers 31 as said every two adjacent heating rollers 31 face each other allows the raw material 1 to be heated as pressure is applied. In other words, the raw material 1 can be hot-formed into a sheet. The thickness of the raw material 1 in the form of a sheet can be adjusted by adjusting the gaps between the facing heating rollers 31. For example, the gaps between the facing heating rollers 31 may be each gradually narrowed from the upstream to the downstream sides in the conveying direction. This enables the heating rollers 31 to be arranged so that the raw material 1 can be surely held between the heating rollers 31. Thus, the raw material 1 uneven in temperature is prevented. It is not necessary to strictly adjust the gaps between the heating rollers 31 because the purpose of the heating rollers 31 is not to shape the raw material 1.

Figure 7:
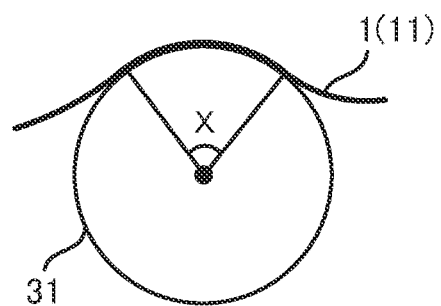
FIG. 7 illustrates a wrap angle x of a heating roller 31.

In FIG. 1, every two adjacent heating rollers are arranged so as to face each other. As can be seen from FIG. 1, a wrap angle is set for each of the heating rollers 31 except the heating rollers 31 on the most upstream and downstream sides. FIG. 7 illustrates the wrap angle. FIG. 3 is an enlarged view of the heating rollers 31 of FIG. 1.

Figure 8:
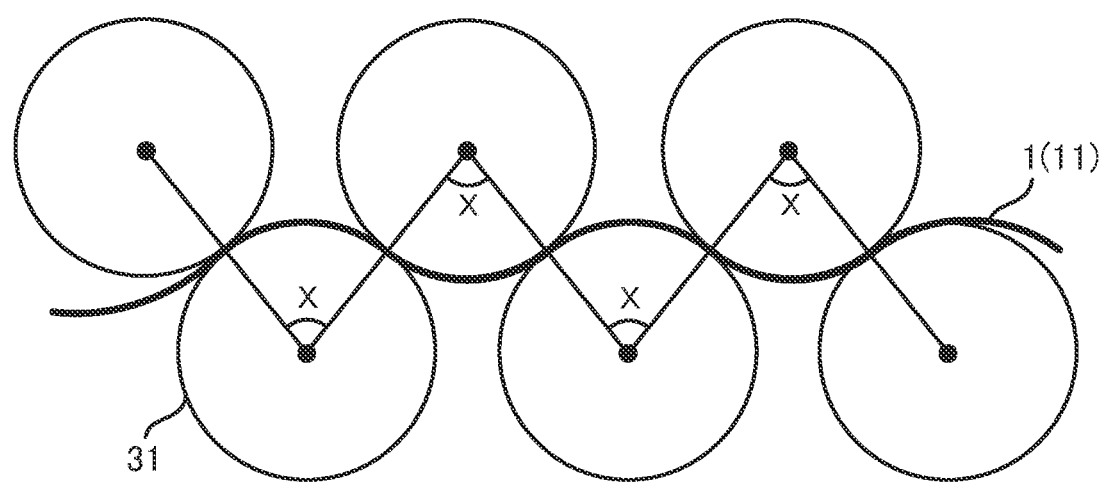
FIG. 8 is an enlarged view of the heating rollers 31.

As indicated by "x" in FIGS. 7 and 8, "wrap angle" is a center angle corresponding to part of the circumference of each of the heating rollers 31 from a place which the raw material 1 (conveying member 11) comes into contact with the circumference to a place where the raw material 1 separates from the circumference. Setting the wrap angle x for each of the heating rollers 31 as in FIG. 7 can increase the contact area between the heating rollers 31 and the raw material 1, and can improve heating efficiency. In addition, nonuniform heating is suppressed and the gas exchange can be promoted because the raw material 1 can be drawn to be moved. The adhesion of the raw material 1 to the heating rollers 31 can be also suppressed. Both the faces of the raw material 1 held between the heating rollers 31, which are arranged as facing each other, are heated, and thereby, the firing of the raw material 1 progresses, whereas a contact face of the raw material 1 which is not held between the heating rollers 31 but is in contact with the heating rollers 31 arranged on one of the top and bottom faces of the raw material 1 is heated, and at the same time gas can be exchanged via an open face thereof which is not in contact with the heating rollers 31. Thus, the firing of the raw material 1 can be promoted. Therefore, the arrangement of the heating rollers 31 as in FIGS. 1 and 8 enables both the faces, and either one face of the raw material 1 to be alternately heated (hot-formed in the case of both the faces). According to this, the heating and the efficient gas exchange are alternately performed, and the firing is promoted.

The wrap angle x of each of the heating rollers 31 is not particularly limited, but according to the mode of the arrangement of FIG. 1, may be at least 10°, at least 20°, at most 180°, or at most 90°. Each of the heating rollers having a wrap angle less than 10° leads to difficulty in drawing to move the raw material 1. Each of the heating rollers 31 having a wrap angle more than 180° have no disadvantage. Each of the heating rollers 31 having a wrap angle more than 180° may lead to easily slipping down of the raw material 1 from some place of the side parts of the conveying member 11 vertically near the heating rollers 31. The conveying member 11 having the retaining parts for the raw material of the cathode active material suppresses such slipping down. In the mode of the arrangement of FIG. 1, it is preferable to set the wrap angle of each of the heating rollers 31 in 180° or less because of a structural matter. The mode of each of the heating rollers 31 having a wrap angle more than 180° will be described later in the second embodiment.

In FIG. 8, the heating rollers 31 are arranged so that the straight line connecting the centers of every two adjacent heating rollers 31 overlaps one of the straight lines that form the wrap angle of any one of said every two adjusting heating rollers. This enables the raw material 1 to be always in contact with the heating rollers 31, can improve beating efficiency, and can shorten the heating time.

In FIG. 8, the wrap angle is set for each of the heating rollers 31 except the heating rollers 31 on the most upstream and downstream sides. The wrap angle may be also set for each of the heating rollers 31 on the most upstream and downstream sides. For example, using touch rolls allows the wrap angles of the most upstream and downstream heating rollers 31 to be set in predetermined values.

The material of the heating rollers 31 is not particularly limited. For example, the heating rollers 31 may be made from a material that is resistant to a temperature of 1000° C. or higher. Examples of such a material include inorganic materials such as ceramics, and metallic materials such as iron.

The rotation direction of the heating rollers 31 may be in normal rotation (rotation in the same direction as the conveying direction), or in reverse rotation (rotation in the direction opposite to the conveying direction). The rotation number of the heating rollers 31 is not particularly limited. The skilled person may appropriately select an optimum rotation direction in which, and an optimum rotation number at which both thermal uniformity and economic efficiency are achieved.

The surfaces of the heating rollers 31 may have roughness. The surfaces of the heating rollers 31 in a rough form enable the raw material 1 in contact with the heating rollers 31 to be drawn to be moved, can suppress nonuniform heating, and can promote the gas exchange. The adhesion of the raw material 1 to the heating rollers can be also suppressed. In addition, as shown in FIG. 6, the heating rollers 31 may be provided with the predetermined projecting parts 31*d* in order to prevent the raw material 1 from slipping down.

The length of the heating rollers 31 in the width direction is not particularly limited, but, for example, may be set in the same length as the length of the conveying member 11 in the width direction. The diameter of the heating rollers 31 is suitably set in view of the size of the heating unit 30, and in view of appropriate heating of the raw material 1.

<Recovery Part 40>

The recovery part 40 is a member with which the cathode active material 2 obtained in the heating unit 30 is recovered. When the cathode active material 2 is sandwiched in and conveyed by the conveying member 11 as in FIG. 1, one may separate the sheets of the conveying member at the recovery part 40, and recover the cathode active material 2 from the inside of the conveying member. In order to separate the sheets of the conveying member 11 like this, predetermined rollers 41 may be appropriately arranged. The recovered cathode active material 2 may be pulverized. The way of pulverizing the cathode active material 2 is not particularly limited. The cathode active material 2 may be pulverized with, for example, a hammer after the recovery. When the raw material 1 is in the form of a sheet, the obtained cathode active material 2 is also in the form of a sheet, and thus, can be easily pulverized. For example, the cathode active material 2 pulverizes just by the recovery thereof as in FIG. 1.

When the porous heat-resistant member is used for the conveying member 11, the cathode active material 2 may be buried in the internal pores. In such a case, the cathode active material 2 buried inside can be recovered by vibrating the conveying member 11 in a condition where the conveying member 11 is turned over, or by blowing air against a face of the conveying member 11 which is not in contact with the cathode active material 2 (the arrows in FIG. 1), which can improve productivity. An example of equipment with which the vibration is imposed is a vibration knocker. An example of equipment with which air is blown is an air blower.

<Cathode Active Material 2>

The cathode active material 2 obtained in the production apparatus 100 has composition such that lithium is inserted into the metal oxide. For example, the molar ratio of the metallic elements of the cathode active material 2 may be Li:Ni:Co:Mn=s:x:y:z (0.8≤s≤1.2, x=1-y-z, 0≤y<1 and 0≤z<1), or Li:Ni:Co:Al=s:x:y:z(0.8≤s≤1.2, x=1-y-z, 0≤y<1 and 0≤z<1). The composition of the cathode active material 2 may be $Li_sNi_xCo_yMn_z(O)_{2+\alpha}$ (0.8≤s≤1.2, x=1-y-z, 0≤y<1, 0≤z<1 and −0.5≤α<0.5), or $Li_sNi_xCo_yAl_z(O)_{2+\alpha}$ (0.8≤s≤1.2, x=1-y-z, 0≤y<1, 0≤z<1 and −0.5≤α<0.5).

The variations in the crystallinity of the obtained cathode active material 2 are reduced since the raw material 1 is fired by contact heating. The variations in the crystallinity are obtained by crystallite size determination with XRD. The optimum range of the crystallite size (unit: nm) is set in view of the evaluation result of a battery including the cathode active material 2. For example, the range of the variations in the crystallite size may be approximately ±200 nm, ±100 nm, or ±50 nm.

Second Embodiment

Figure 9:
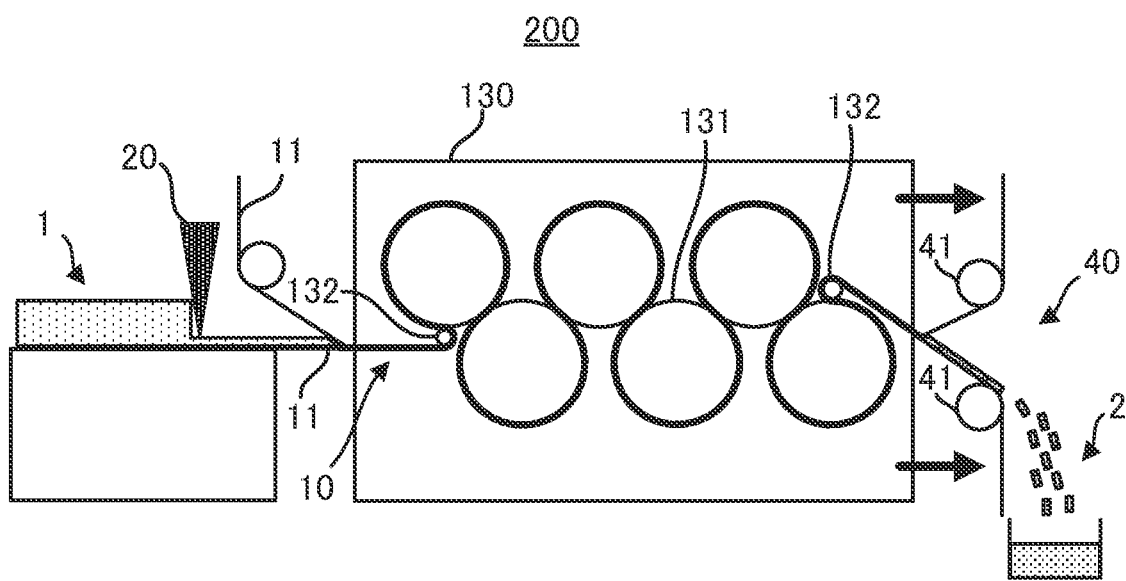
FIG. 9 is a schematic view of a production apparatus 200 for a cathode active material for lithium ion secondary batteries.

Next, the second embodiment will be described. FIG. 9 is a schematic view of a production apparatus 200 for a cathode active material for lithium ion secondary batteries which is the second embodiment (may be referred to as "production apparatus 200" in this description). The production apparatus 200 is the same as the production apparatus 100 except that the heating unit 30 is changed to a heating unit 130; specifically, the wrap angle x of each of the heating rollers 31 is changed to be more than 180°. The structure excluding the heating unit 130 is the same as the production apparatus 100.

Figure 10:
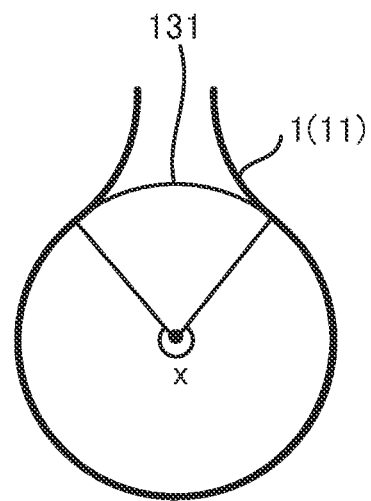
FIG. 10 illustrates a wrap angle x of a heating roller 131.

As shown in FIG. 9, the heating unit 130 is provided with the six heating rollers 131 as well as the heating unit 30. The wrap angle x of each of the heating rollers 131 is wider than that of each of the heating rollers 31 of the heating unit 30. Specifically, the wrap angle x of each of the heating rollers 131 is more than 180° and at most 360°. FIG. 10 illustrates the wrap angle x of one of the heating rollers 131. The wrap angle x has been described above, and thus, the description thereof is omitted here.

Each of the heating rollers 131 having a wrap angle x more than 180° causes the cathode active material raw material 1 to be conveyed in the height direction. Thus, tumbling of the raw material 1 is promoted in the conveying, thermal uniformity is improved, and the gas exchange is promoted. This suppresses the cathode active material 2, which is a product, uneven in the oxidation to improve the quality of the cathode active material 2. This can also lengthen the contact time of the heating rollers 31 and the raw material 1, which allows facilities to be smaller.

Each of the heating rollers 131 having a wrap angle x more than 180° creates a stronger tension on the conveying member 11 than that having a wrap angle x of 180° or less when the raw material 1 is conveyed in the height direction, and the raw material 1 in the conveying member 11 receives a load in the height direction, which may lead to the raw material 1 slipping down from the side parts. Such slipping down is suppressed since the conveying member 11 has the predetermined retaining parts for the raw material of the cathode active material. The wrap angle x of each of the heating rollers 131 may be at least 210°, at least 240°, at least 270°, at least 300°, less than 3600, at most 350°, or at most 330°.

The heating unit 130 is provided with touch rolls 132 unlike the heating unit 30. The touch rolls 132 are used for setting the wrap angles of the heating rollers 131 adjacent thereto. The touch rolls 132 may be arranged at positions opposite to the heating rollers 131 adjacent thereto, respectively. In FIG. 9, the touch rolls 132 are provided at positions adjacent to the heating rollers 131 on the upstream and downstream sides, respectively, in the conveying direction. In the production apparatus 200, the touch rolls 132 are optional members. The number of the touch rolls may be at least one. Further, the positions of the touch rolls 132 are not particularly limited as long as the touch rolls 132 are arranged at positions adjacent to the heating rollers 131 for which the wrap angles x are to be set using these touch rolls 132.

The material of the touch rolls 132 is not particularly limited, but, for example, can be appropriately selected from the examples of the materials for the heating rollers 131. The length of each of the touch rolls 132 in the width direction is not particularly limited, but, for example, may be set in the same length as the length of the conveying member 11 in the width direction. The diameter of each of the touch rolls 132 can be appropriately set based on the size of the heating unit 130, and the wrap angles of the heating rollers 131.

Figure 11:
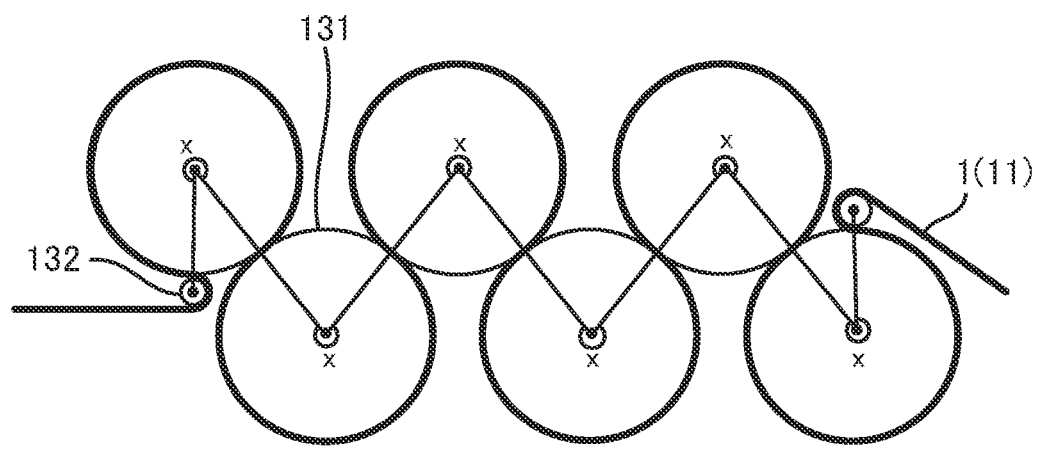
FIG. 11 is an enlarged view of the heating rollers 131 and touch rolls 132.

The wrap angle x can be set according to the mode of arranging the heating rollers 131 and the touch rolls 132. FIG. 11 is an enlarged view of the heating rollers 131 and the touch rolls 132. In FIG. 11, the heating rollers 131 are arranged so that every two adjacent heating rollers 131 face each other to have the predetermined wrap angles x. Such an arrangement enables the wrap angle x of each of the heating rollers 131 to be set in a predetermined value except the most upstream and downstream heating rollers 131. The touch rolls 132 are arranged at positions adjacent to the heating rollers 131 on the upstream and downstream sides in the conveying direction. This enables the wrap angles of the most upstream and downstream heating rollers 131 to be set in predetermined values. Further, as shown in FIG. 11, the heating rollers 131 are arranged so that the straight line connecting the centers of every two adjacent heating rollers 131 overlaps one of the straight lines that form the wrap angle of any one of said every two adjusting heating rollers. This enables the raw material 1 to be always in contact with the heating rollers 131, can improve heating efficiency, and can shorten the heating time.

Third Embodiment

Figure 12:
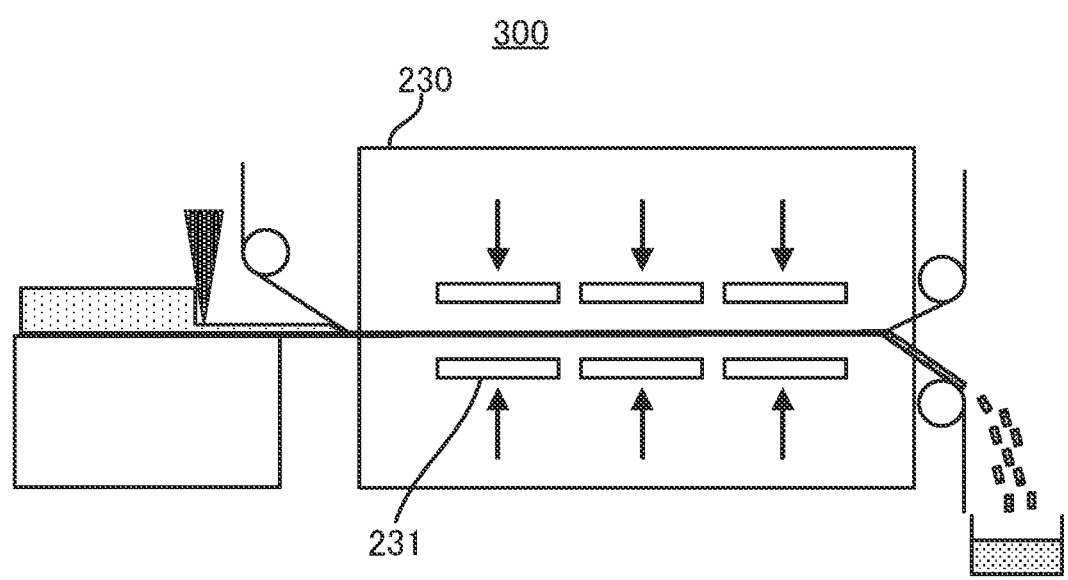
FIG. 12 is a schematic view of a production apparatus 300 for a cathode active material for lithium ion secondary batteries.

Next, the third embodiment will be described. FIG. 12 is a schematic view of a production apparatus 300 for a cathode active material for lithium ion secondary batteries which is the third embodiment (which may be referred to as "production apparatus 300" in this description). The production apparatus 300 is the same as the production apparatus 100 except that the heating unit 30 is changed to a heating unit 230; specifically, the heating rollers 31 are changed to tabular heating members 231. The structure excluding the heating unit 230 is the same as the production apparatus 100.

The tabular heating members 231 are tabular heating members. As shown in FIG. 12, three pairs of the tabular heating members 231 are aligned in the conveying direction: each pair is made up of two tabular heating members 231 on the upper and lower sides, respectively. The raw material 1 is heated by raising and lowering the tabular heating members 231, and holding the raw material 1 between the tabular heating members 231. At this time, the raw material 1 may be pressure-molded. In the heating, the conveying member 11 is temporarily stopped. Like this, contact heating can be realized even with the tabular heating members 231 as heating members.

The same material as the heating rollers 31 may be used for the material of the tabular heating members 231. The size, the area, etc. of the tabular heating members 231 can be appropriately set.

[Supplementary]

In the production apparatuses 100, 200 and 300, a plurality of the heating members (heating rollers, tabular heating members) are used. The production apparatus according to the present disclosure is not limited to this as long as provided with at least one heating member because it is sufficient that the heating member(s) of the minimum number necessary for firing the raw material 1 is installed. The heating members are not limited to be in the form of a roll or a table, but any of various forms may be employed therefor because it is sufficient that the heating members have a shape with which contact heating can be realized. According to the first and second embodiments, the wrap angle x of each of the heating rollers is not limited, but may be appropriately selected from the range of 0° to 360°.

2. Production Method for Cathode Active Material for Lithium Ion Secondary Batteries A production method for a cathode active material for lithium ion secondary batteries according to the present disclosure will be described with reference to the following first to third embodiments.

First Embodiment

The production method for a cathode active material for lithium ion secondary batteries according to the present disclosure will be described with reference to a production method for a cathode active material for lithium ion secondary batteries which is the first embodiment (which may be referred to as "production method 1000" in this description).

Figure 13:
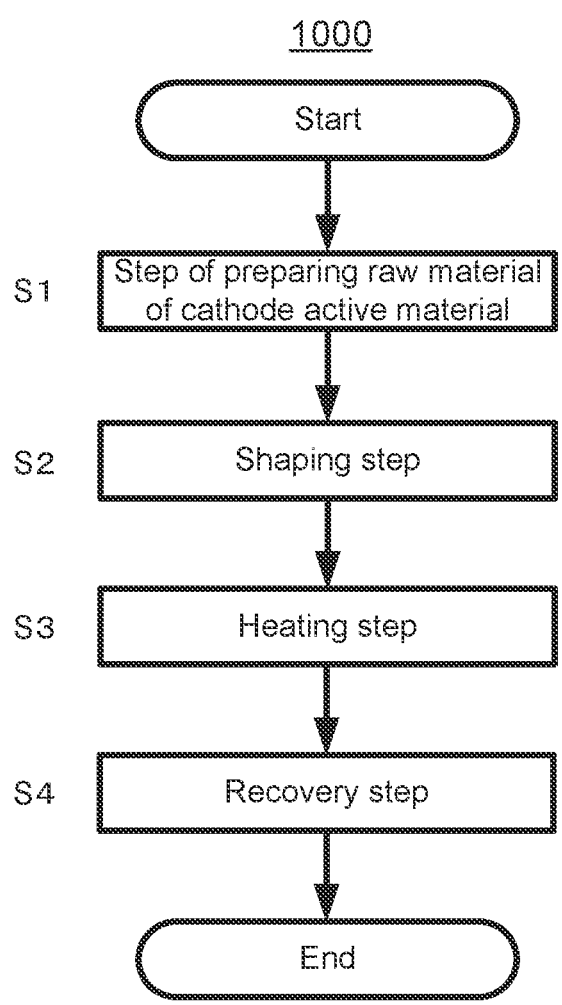
FIG. 13 is a flowchart 1000 of a production method for a cathode active material for lithium ion secondary batteries.

FIG. 13 shows a flowchart of the production method for a cathode active material for lithium ion secondary batteries which is the first embodiment (which may be referred to as "production method 1000" in this description). As shown in FIG. 13, the production method 1000 includes a step S1 of preparing a raw material of a cathode active material, a shaping step S2, a heating step S3 and a recovery step S4. The shaping step S2, the heating step S3 and the recovery step S4 can be performed with the production apparatus according to the present disclosure.

(Step S1 of Preparing Raw Material of Cathode Active Material)

The step S1 of preparing a raw material of a cathode active material is a step of mixing a metallic compound and a lithium compound to obtain a raw material of a cathode active material. Here, the metallic compound, the lithium compound, and the raw material of a cathode active material have been described above, and thus, the description thereof is omitted here. The mixing way has been also described above, and thus, the description thereof is omitted here.

<Shaping Step S2>

The shaping step S2 is an optional step, and is provided prior to the heating step S3. The shaping step S2 is a step of shaping the raw material into a sheet. The way of shaping the raw material into a sheet is not particularly limited. For example, any of the above-described shaping ways can be employed.

<Heating Step S3>

The heating step S3 is a step of heating (firing) the raw material. Specifically, the heating step S3 is a step of heating the raw material by heat conduction. The way of heating the raw material has been described above, and thus, the description thereof is omitted here.

<Recovery Step S4>

The recovery step S4 is a step of recovering the cathode active material obtained in the heating step S3. The way of recovering the cathode active material is not particularly limited. For example, any of the above-described recovering ways can be employed.

Second Embodiments

Figure 14:
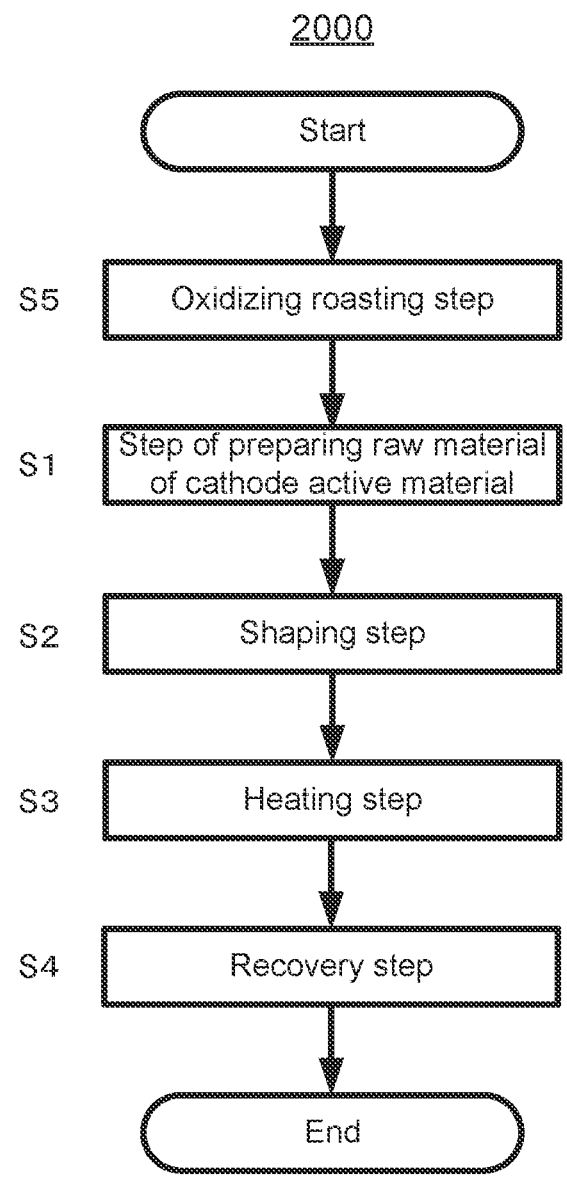
FIG. 14 is a flowchart 2000 of a production method for a cathode active material for lithium ion secondary batteries.

Next, the second embodiment will be described. FIG. 14 shows a production method 2000 for a cathode active material for lithium ion secondary batteries which is the second embodiment (which may be referred to as "production method 2000" in this description). The production method 2000 is the same as the production method 1000 except that an oxidizing roasting step S5 is provided therein. The oxidizing roasting step S5 is provided prior to the step S1 of preparing a raw material of a cathode active material, and is a step of heating a metal hydroxide in an oxidizing atmosphere. The way of oxidizing and roasting the metal hydroxide has been described above, and thus, the description thereof is omitted here. The metal oxide can be obtained by providing the oxidizing roasting step S5. The use of the raw material containing the metal hydroxide in the heating step S3 may cause the temperature to be uneven since the oxidation of the metal hydroxide is via an endothermic reaction. Therefore, in the production method 2000, the oxidizing roasting step S5 is provided, and the metal hydroxide is oxidized in advance. It is noted that unevenness in temperature is reduced even if the raw material containing the metal hydroxide is used since contact heating is employed in the heating step S3.

Third Embodiment

Figure 15:
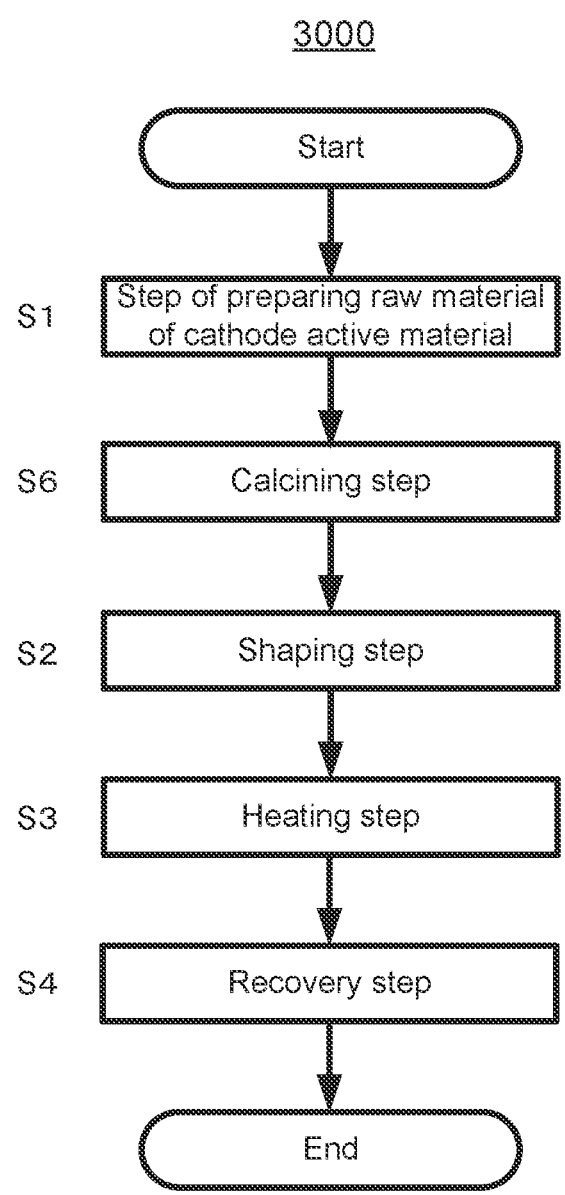
FIG. 15 is a flowchart 3000 of a production method for a cathode active material for lithium ion secondary batteries.

Next, the third embodiment will be described. FIG. 15 shows a production method 3000 for a cathode active material for lithium ion secondary batteries which is the third embodiment (which may be referred to as "production method 3000" in this description). In the production method 3000, a calcining step S6 is provided prior to the shaping step S2. The calcining step S6 is a step of heating the raw material of a cathode active material in an oxidizing atmosphere. The calcining step S6 enables the metal hydroxide to be oxidized to the metal oxide, and the lithium compound such as a lithium hydroxide to be oxidized to lithium oxide. Such an oxidation reaction is an endothermic reaction. Thus, the completion of the oxidation of the raw material in the calcining step S6 can prevent the raw material from being uneven in temperature in the heating step S3, and enables short-term firing. It is noted that the raw material containing the metal hydroxide etc. can be appropriately fired and the cathode active material can be obtained even if the calcining step S6 is not provided since contact heating is employed in the heating step S3.

The heating temperature in the calcining step S6 is, for example, 700° C. to 800° C. The heating time is, for example, 0.5 hours to 3 hours. Such heating can be carried out using firing equipment such as a rotary kiln.

[Supplementary]

In the production method according to the present disclosure, the oxidizing roasting step and the calcining step may be combined.

3. Effect

The production apparatus and production method for a cathode active material for lithium-ion secondary batteries according to the present disclosure have been described using the embodiments. In the present disclosure, contact heating of heating a raw material of a cathode active material by heat conduction is employed. The features of contact heating are that a contacted portion can be efficiently heated, and that the contacted portion is not so much uneven in temperature (has high thermal uniformity). Therefore, the present disclosure employing contact heating can shorten the firing time of a raw material of a cathode active material, and can suppress variations in crystallinity. In addition, according to the present disclosure, a raw material of a cathode active material can be fired in one heating unit (heating step) to obtain the cathode active material, which is different from the conventional art. Thus, the present disclosure can improve manufacturing productivity of a cathode active material. Facilities can be also smaller because of a shortened heating time.

According to the present disclosure, predetermined retaining parts for the raw material of the cathode active material are provided along side parts of a conveying member, which can prevent the raw material 1 from slipping down. Therefore, the present disclosure can further improve the manufacturing productivity of the cathode active material 2.

EXAMPLES

Hereinafter the present disclosure will be further described using examples.

Like in FIG. 9, a production apparatus was prepared. As a raw material of a cathode active material, a mixture of nickel cobalt manganate and lithium carbonate was prepared. Then, the raw material was put on a conveying member and heated in a heating unit to prepare the cathode active material. At this time, the heating rollers were set to have a temperature of 950° C. to 1000° C. All the heating rollers were set to each have a wrap angle more than 180°.

Here, in an example, a conveying member having retaining parts for the raw material of the cathode active material that were formed by bending side parts thereof plural times like in FIG. 3 was used. In a comparative example, a conveying member having no retaining part for the raw material of the cathode active material was used.

Based on the above, the cathode active material was produced five times under the condition of the example, and five times under the condition of the comparative example. Then, the recovery rate of the cathode active material was evaluated for each production. The recovery rate of the cathode active material was calculated assuming that the weight of the cathode active material when the entire raw material became the cathode active material and recovered was defined as 100%. As a result, in the comparative example, the recovery rate of the cathode active material was approximately 58 to 67%, whereas, in the example, 98% to 100%. The difference of these results is considered to be because the retaining parts prevented the raw material from slipping down.

INDUSTRIAL APPLICABILITY

The cathode active material produced according to this disclosure may be used for a cathode for any of a nonaqueous lithium-ion secondary battery, an aqueous lithium-ion secondary battery, and an all-solid-state lithium-ion secondary battery.

REFERENCE SIGNS LIST 1 raw material of a cathode active material
2 cathode active material
10 conveying device
11 conveying member
12a, 12b, 12c, 12d retaining part for the raw material of the cathode active material
20 shaping member
30, 130, 230 heating unit
31, 131 heating roller (heating member)
31d projecting part
40 recovery part
41 roller
132 touch roll
231 tabular heating member (heating member)
100, 200, 300 production apparatus for a cathode active material for lithium ion secondary batteries

What is claimed is:

1. A production apparatus for a cathode active material for lithium ion secondary batteries, the production apparatus comprising:
a conveying device that conveys a raw material of a cathode active material, the raw material containing a metallic compound and a lithium compound, the metallic compound including at least one metallic element selected from the group consisting of nickel, cobalt, and manganese;
a heating unit in which the raw material is heated; and
a shaping member with which the raw material is shaped into a sheet, the shaping member being arranged on an upstream side of the heating unit in the conveying direction,
wherein the heating unit has at least one heating member that heats the raw material by heat conduction,
the conveying device comprises a conveying member that conveys the raw material,
the heating member heats the raw material via the conveying member,
the conveying member comprises a pair of sheet-shaped members, wherein the pair of sheet-shaped members comprise a first sheet-shaped member and a second sheet-shaped member, wherein the pair of sheet-shaped members convey the raw material with the raw material being sandwiched between the pair of sheet-shaped members,
the pair of sheet-shaped members comprise a pair of retaining parts for the raw material of the cathode active material along both side parts of the pair of sheet-shaped members in a width direction, wherein the pair of retaining parts comprise a pair of protruding parts protruding from the first sheet-shaped member toward the second sheet-shaped member,
the at least one heating member comprises a plurality of heating rollers,
some of the heating rollers that heat one face of the raw material, and the rest of the heating rollers that heat another face of the raw material are alternately arranged from an upstream side to a downstream side in a conveying direction, and
the heating rollers are arranged such that every two adjacent ones of the heating rollers face each other so that the pair of sheet-shaped members are held therebetween, wherein the raw material is held between the pair of sheet-shaped members.

2. The production apparatus according to claim 1, wherein the heating rollers each have a wrap angle more than 180° and at most 360°.

3. The production apparatus according to claim 1, wherein in the heating unit, the raw material is heated to 700° C. to 1000° C.

4. The production apparatus according to claim 1, wherein in the heating unit, the raw material is heated in an oxidizing atmosphere.

5. The production apparatus according to claim 1, wherein the conveying member is made of a porous heat-resistant member.

6. The production apparatus according to claim 1, further comprising:
 a recovery part with which the cathode active material obtained in the heating unit is recovered.

7. The production apparatus according to claim 1, wherein both side ends of the first sheet-shaped member are folded toward the second sheet-shaped members, to form the pair of protruding parts.

8. The production apparatus according to claim 1, wherein heat-resistant wires are interwoven along both side parts of the first sheet-shaped member, to form the pair of protruding parts.

9. The production apparatus according to claim 1, wherein the plurality of heating rollers comprises a first set of heating rollers directly and physically contacting the first sheet-shaped member, wherein the first set of heating rollers each comprise a pair of protrusions and a recess defined between the pair of protrusions,
 the pair of protrusions of the first set of heating rollers push the first sheet-shaped member toward the second sheet-shaped member, to form the pair of protruding parts of the first sheet-shaped member.

* * * * *